United States Patent [19]

van Wingerden

[11] 4,050,188

[45] Sept. 27, 1977

[54] SEEDLING GROWING CONTAINER

[76] Inventor: Aart van Wingerden, R.R. 2, Fletcher, N.C. 28732

[21] Appl. No.: 662,369

[22] Filed: Mar. 1, 1976

[51] Int. Cl.² ............................................. A01G 9/02
[52] U.S. Cl. ........................................ 47/85; 220/22; 206/561; 249/128; 249/131; 249/132
[58] Field of Search .............. D35/3 A, 3 R; 220/21, 220/22, 22.3; 229/27; 47/37, 34.13, 34, 34.11; 206/553-564; 249/128-132

[56] References Cited

U.S. PATENT DOCUMENTS

| 2,318,711 | 5/1943 | Phelan | 47/34.13 |
|---|---|---|---|
| 2,870,575 | 1/1959 | Weber | 47/34.13 |
| 2,944,696 | 7/1960 | Effgen | 220/22 |
| 3,447,261 | 6/1969 | Hundt | 47/34.13 |
| 3,513,594 | 5/1970 | Hasselbach | 47/37 |
| 3,557,489 | 1/1971 | Ferrand | 47/37 |
| 3,667,159 | 6/1972 | Todd | 47/34.13 |
| 3,788,002 | 1/1974 | Suchka | 47/34.13 |

FOREIGN PATENT DOCUMENTS

| 1,307,886 | 9/1962 | France | 47/34.13 |
|---|---|---|---|
| 2,362,457 | 7/1974 | Germany | 47/37 |
| 547,666 | 4/1932 | Germany | 47/37 |
| 306,018 | 2/1933 | Italy | 47/85 |
| 71,638 | 11/1948 | Norway | 47/85 |

Primary Examiner—Robert E. Bagwill
Attorney, Agent, or Firm—Bailey, Dority & Flint

[57] ABSTRACT

A seedling growing container such as a tray, is illustrated providing a drainage channel opening in a side of the bottom of respective compartments to permit side removal of the seedling and the entire root system including any portion of the root system which may have grown through the drainage opening. Since the drainage channel opens at an open side of the compartments there is no obstruction to the removal of any roots which may have grown through and around the drainage passageway.

7 Claims, 8 Drawing Figures

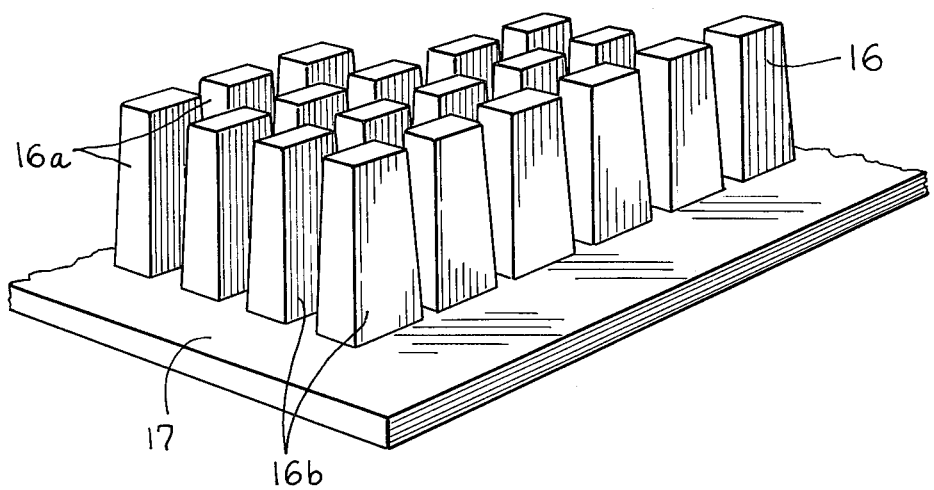
Fig. 4.
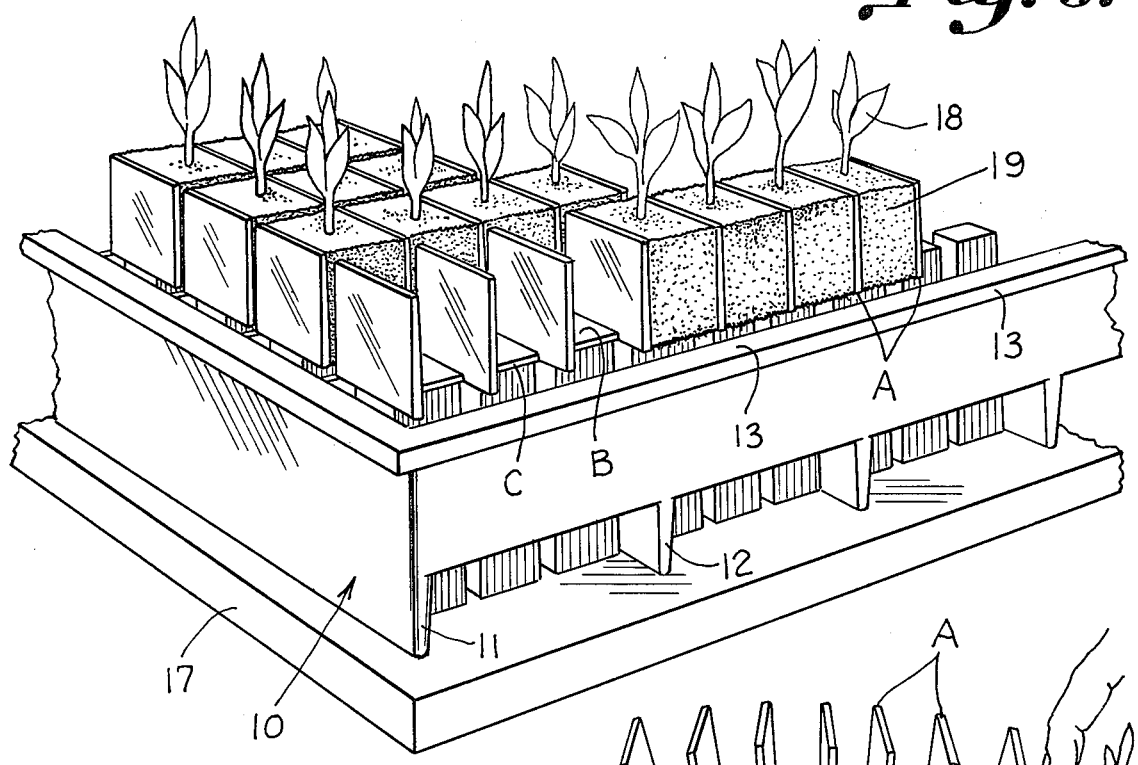
Fig. 5.
Fig. 5A.

SEEDLING GROWING CONTAINER

BACKGROUND OF THE INVENTION

It has long been known that seedlings, and for that matter any growing plant, should be subjected to as little shock as possible throughout its growing cycle.

One of the chief causes of shock is the removal of a small plant or seedling prior to being transplanted in a larger growing receptacle for additional growth prior to final transplanting or when transplanting to the ultimate growth area, as in a field. Thus, if the grower subjects his plants to one or more severe shocks the plant will reward him with less growth and produce. For the purposes of the disclosure contained herein, the term seedling is intended to mean any small plant which is propagated prior to transplanting in the ultimate location wherein it is to mature.

Efforts have been made to minimize the shock to growing seedlings when transplanting by providing collapsible or other containers wherein the root system may be removed with a minimum of shock to the plant. For example, U.S. Pat. No. 2,870,575 illustrates a U-shaped individualized compartment, but such are difficult to manipulate and provide only limited drainage. U.S. Pat. No. 3,788,002 illustrates a collapsible container, but drainage openings are centrally located in the bottoms of compartments therein and the root systems tend to grow through and around such openings increasing the shock to the root system as the plant is pulled away therefrom, tending to shatter the plant and its root structure. U.S. Pat. No. 3,667,159 illustrates a seedling flat molded integrally of plastic and having compartments tapering downwardly toward an open bottom. Such receptacles are especially useful in connection with plants having deep root systems, such as pine tree seedlings. The theory is that the plant and its root system may be readily lifted from the downwardly and inwardly tapering compartments, but here again, there is a problem induced by the root system growing through and around the open bottom. Such receptacles are of limited value for growing those seedlings which do not have deep root systems since only minimal amounts of growing medium are available where needed.

The use of other systems, such as peat pots and the like are relatively expensive and the compressed material of the peat pot tends to inhibit the propagation of roots upon transplanting. An excellent method of growing more mature plants for transplanting is exemplified by the disclosure of U.S. Pat. No. 2,829,468 wherein soil blocks or units are compressed into separate squares and a central cavity formed therein for the reception of a small seedling which has been grown in a seedling tray which is not compartmentalized. Substantial shock is induced by removing the seedling for manual transplanting of the root system in the cavity in the blocks of growing medium. As will be observed below, growing trays of the present invention are especially useful in avoiding such shock.

Accordingly, it is an important object of this invention to provide a growing container for seedlings and the like having a side opening drainage channel which permits removal of the root system through an open side of the compartment adjacent the open drainage channel thus minimizing shock to the plant.

Another important object of this invention is to provide a seedling growing device especially adapted to seedling removal from an open side of the compartments with minimal damage to the root system, permitting transplanting in larger squares of growing material for propagation of a more mature plant to be placed in the permanent growing area.

Another important object of the invention is to provide compartmentalized insert strips, a number of which may be carried in a tray for easy removal thereof and for ready reception by a grading means for subsequent transplanting of the graded plants by automatic transplanter means.

Still another important object of the invention is the provision of a growing tray especially for plants such as pine seedlings having deep root systems which can be readily removed from the open side of compartments having side opening drainage channels in the bottom.

BRIEF DESCRIPTION OF THE INVENTION

It has been found that seedling growing containers may be provided for propagating young plants for removal therefrom with minimum shock to the plant by the use of compartments having an open side adjacent the opening of a drainage channel extending from the open side into the bottom. This permits removal of the entire root system including any portion which has grown downwardly and around the drainage opening at the bottom.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 4 is a perspective view of a lifting grill constructed in accordance with the invention for facilitating removal of insert strips such as are illustrated in FIG. 1, FIG. 5 is a perspective view illustrating the insert strips in elevated position for ready removal as a result of the placement of the tray on the lifting grill permitting ready removal of the plants and their entire root systems, FIG. 5A is a perspective view further illustrating the insert strip with the insert strip flexed for separating compartment sides facilitating side removal of the seedlings.

DESCRIPTION OF A PREFERRED EMBODIMENT

Figure 1:
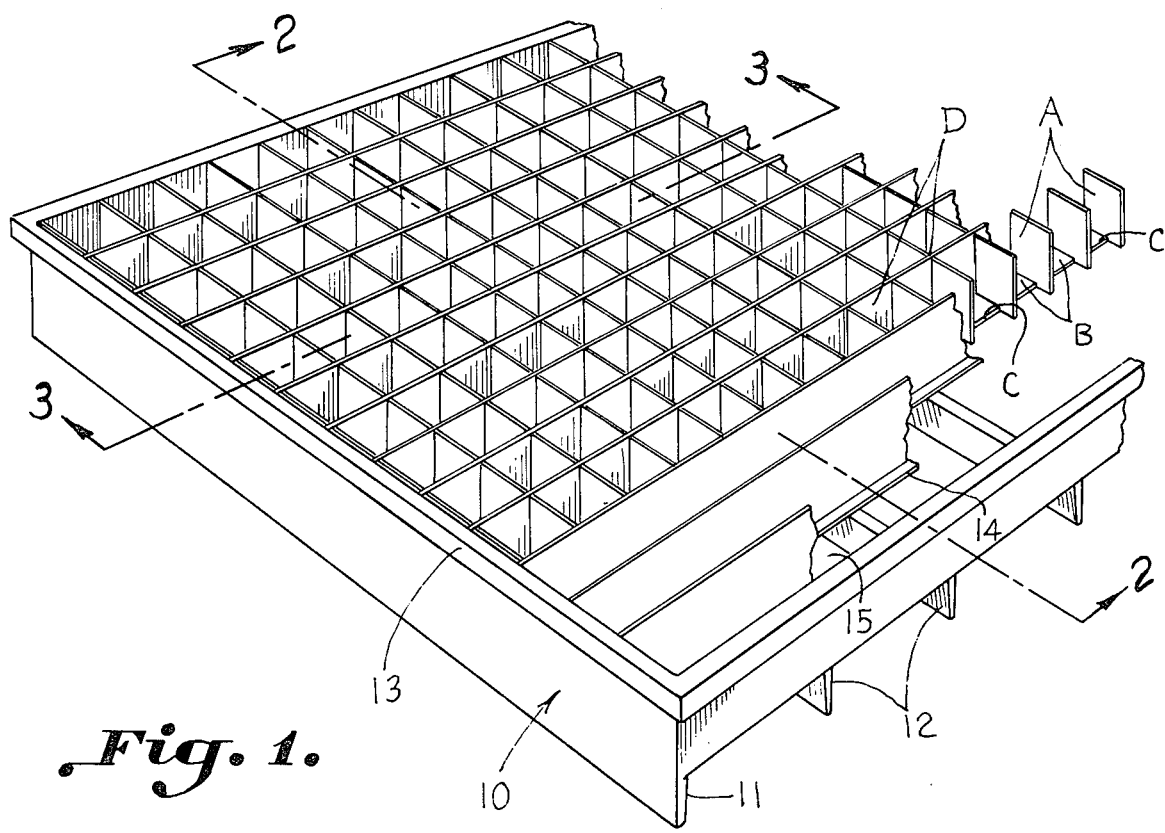
FIG. 1 is a perspective view illustrating a seedling tray containing a number of compartmentalized insert strips constructed in accordance with the invention.
Figure 2:
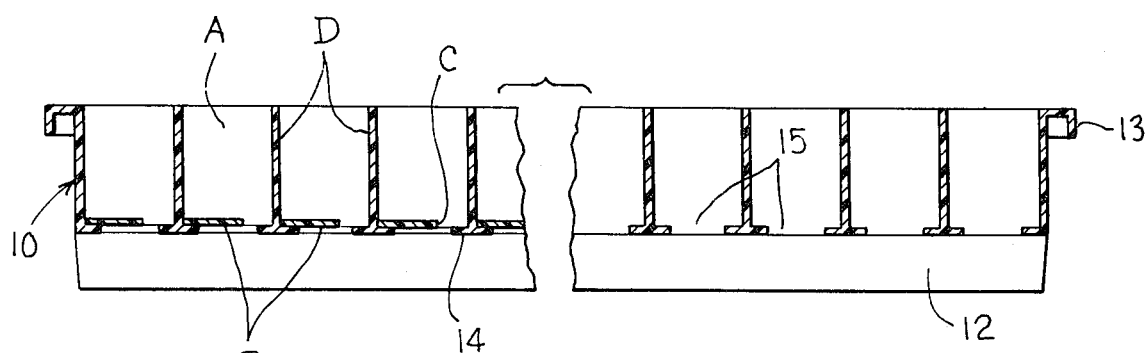
FIG. 2 is a longitudinal sectional elevation taken on the line 2—2 in FIG. 1.
Figure 3:
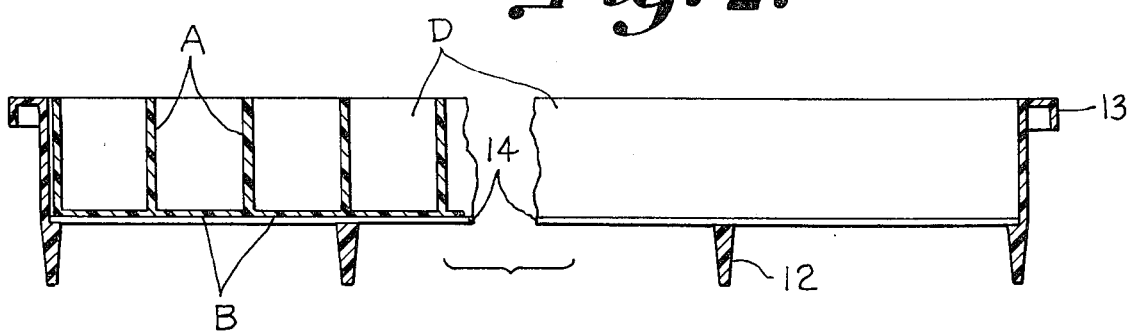
FIG. 3 is a transverse sectional elevation taken along the line 3—3 in FIG. 1.

A seedling tray is illustrated for separating the growing medium and the root system of each of many plants facilitating growing and subsequent removal of the plants and their entire respective root systems. A plurality of interconnected compartments each include a pair of opposed side portions A and a bottom B having integral connection to the side portions. A channel C is defined in the bottom opening toward and accessible from a marginal opening in the bottom, said channel serving as a drainage opening. A pair of walls D extend across each of the pairs of opposed side portions on opposite ends thereof. The wall opposite the channel is separable from the side portions and upon separation, exposes the opening in the channel. Thus, upon separation of the wall, each individual plant may be removed through an open side of the respective compartments without substantially disturbing the growing medium and the root system associated therewith as illustrated in FIG. 5A.

The seedling tray includes substantially rectangular sides, broadly designated at 10. The entire tray may be constructed of plastic, such as injection molded of polypropylene. It will be noted that a pair of opposed sides have legs 11 for supporting the open bottom of the tray formed by the side members above the surface upon which the tray is carried. Intermediate spaced brace supports for the tray are illustrated at 12. It will be observed that a downturned rim 13 is provided about the tray for adding strength and stability. The tray has an open top and bottom and a plurality of compartments each including a pair of opposed side portions A and a bottom B having integral connection to the side portions. The insert strips thus formed are supported within the tray structure between spaced parallel walls D which accommodate the insert strips therebetween. Each of the insert strips provide a drainage channel opening adjacent one of the sides D as illustrated at C. The walls D are molded integrally with the sides 10 and each has a ledge 14 integrally carried thereby and illustrated as extending from each side thus forming an inverted substantially T-shaped member for supporting the insert strips.

It will be noted that elongated rectangular openings 15 are thus afforded between each of the spaced supports 12 accommodating the insert strips in such a way as not to interfere with the functioning of the drainage openings or channels C. The openings 15 accommodate upwardly projecting members 16 of a grill member illustrated in FIG. 4. The grill has a base 17 and upwardly projecting members 16 formed or cast integrally therewith.

Each of the upwardly projecting members 16 has upwardly extending and inwardly tapering ends 16a and upwardly extending, inwardly tapering sides 16b. Since the upwardly extending projections taper inwardly toward the top the tray is received thereon and projections accommodated by the openings 15 positioning the insert strips in a predetermined position adjacent the upper level of the tray as defined by the upper surface of the rim 13. Thus the seedlings which are illustrated as having a leafy portion 18 and a root system 19 carried within suitable growing medium, such as the customary peat moss to which suitable plant nutrients have been added.

Figure 6:
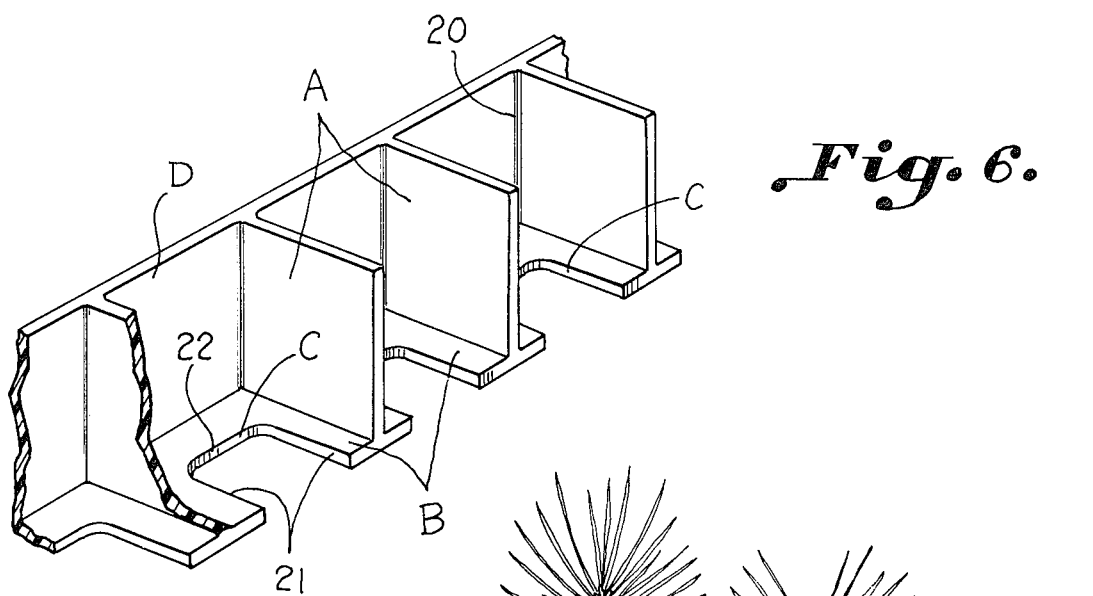
FIG. 6 is a perspective view illustrating an insert strip constructed in accordance with a modified form of the invention.

By reference to FIG. 6, it will be noted that like parts have been designated with like reference characters. Each of the insert strips are provided with additional integral connection between the spaced compartments sides A as by side wall D which has integral connection with opposed sides A as illustrated at 20. Such may be accomplished by integral molding. The channels C formed in the bottom have parallel sides 21 which extend inwardly toward a base 22. Thus, the channel opens outwardly facilitating removal of the root system. Such inserts may be supported within the walls 10 as illustrated in FIG. 1, or the inserts may be otherwise assembled.

Figure 7:
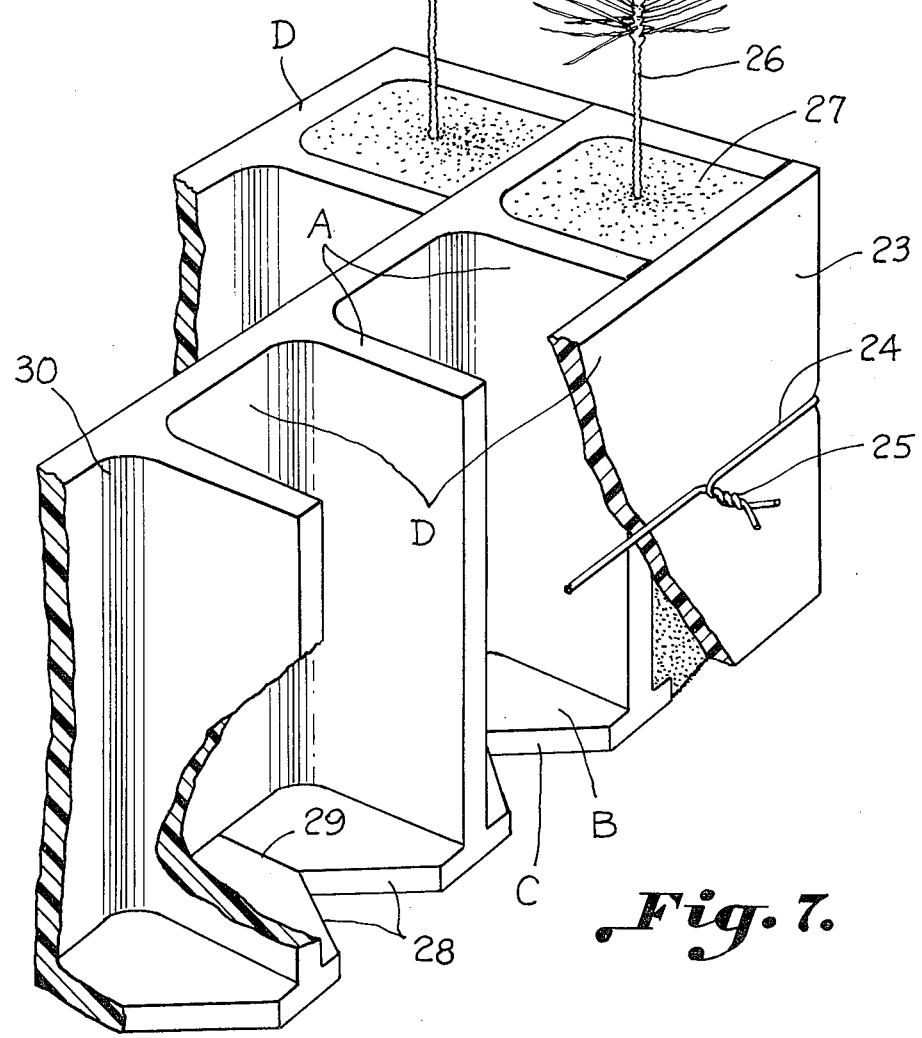
FIG. 7 is a perspective view, with parts broken away, illustrating a seedling tray constructed in accordance with a modified form of the invention especially adapted for propagating seedlings and the like, having deep root systems.

FIG. 7 illustrates another modified form of the invention wherein like reference characters are utilized to designate like parts. The tray structure is formed by the side walls D and a flat tray member 23 is utilized to complete the assembly with all of the aforesaid parts being suitably secured together as by a wire 24 which passes thereabout and is joined as at 25. It will be observed that the compartments are deep to accommodate seedlings such as pine tree seedlings 26 having deep root systems 27. The channel openings at the bottom may be V-shaped having inwardly converging walls 28, the apex of which is slit toward the intergral side D as at 29. Like the modification illustrated in FIG. 6, walls D are integrally molded as from suitable foam plastic, in this instance illustrated as polystyrene at 30. Also, as illustrated in the modification of FIG. 6, the modification shown in FIG. 7 may be utilized in a suitable rectangular tray such as described earlier, or such may be utilized by simply securing together a number of such aligned insert strips and supporting them preferably above the surface upon which they are to be supported during the growing of the seedlings to facilitate drainage.

It is thus seen that a substantially improved growing receptacle has been provided which will permit improved growth of seedlings and young plants with minimal shock thereto when removed for transplanting.

While a preferred embodiment of the invention has been described using specific terms, such description is for illustrative purposes only, and it is to be understood that changes and variations may be made without departing from the spirit or scope of the following claims.

What is claimed is:

1. A seedling tray for separating and subsequently removing plants and their respective entire root system comprising:
   an open bottom tray having sidewalls and endwalls;
   a number of spaced interior walls mounted within said tray; insert strip support means;
   a removable insert strip adapted to be carried between adjacent interior walls by said support means;
   said removable insert strip having spaced aligned sides mounted on an elongated bottom strip to define a series of compartments for containing said plants;
   each of said compartments having a pair of opposed open sides between said aligned sides making each compartment accessible from a pair of opposed open sides to facilitate plant removal therefrom without shock; and
   a channel open on one side formed in the bottom of each compartment to facilitate drainage therefrom.

2. The structure set forth in claim 1, wherein said insert strips are molded flexible plastic, said channels extending between said sides opposite one of said walls.

3. The structure set forth in claim 2 including, a ledge carried by a lower portion of respective walls defining said open bottom tray and supporting said insert strips while in said tray.

4. The structure set forth in claim 3 including, a grill for use with said seedling tray having spaced rows of upward projections receivable between adjacent ledges when said tray containing said insert strips is placed upon said grill for raising said insert strips with respect to said tray facilitating removal thereof.

5. A seedling tray for separating and subsequently removing plants comprising:
   an open bottom tray having sidewalls and endwalls;
   a series of spaced interior walls mounted within said tray;
   ledges extending outwardly from each side of said walls;
   a removable insert strip having a series of plant compartments thereon carried between adjacent ones of said walls and supported on said ledges.

6. The structure set forth in claim 5 wherein ledges of adjacent walls extend inwardly but do not abut, to define an opening therebetween providing access through the bottom of said tray for dislodging said insert strips through upward movement thereof.

7. A seedling unit for separating and subsequently removing plants and their entire root systems, comprising: an elongated flexible plastic strip, a series of first walls extending vertically therefrom and spaced therealong, defining open-sided compartments between adjacent of said walls, said walls extending beyond one side of said strip, whereby when said unit is mounted between second walls confining said first walls and extending normal thereto, a drainage channel is formed in the opening bounded by adjacent first walls, said strip, and one of said second walls.

* * * * *